United States Patent [19]

Schnabl

[11] Patent Number: 4,609,170
[45] Date of Patent: Sep. 2, 1986

[54] FASTENING ELEMENT

[76] Inventor: Ludwig Schnabl, No. 19 Venusberger Strasse, A-3133 Traismauer, Austria

[21] Appl. No.: 538,997

[22] Filed: Oct. 4, 1983

[30] Foreign Application Priority Data

Oct. 4, 1982 [AT] Austria .................. 3661/82

[51] Int. Cl.[4] ............................ F16B 15/00
[52] U.S. Cl. ...................... 248/71; 248/73;
 411/508; 411/451; 411/531; 403/274; 24/458;
 174/164
[58] Field of Search ........ 248/62, 65, 71, 73,
 248/231.91, 216.1, 217.1; 411/531, 539,
 508–510, 451, 455–456; 24/297, 295, 339, 336,
 335, 453, 458; 403/283, 276, 274; 174/164

[56] References Cited

U.S. PATENT DOCUMENTS

| 1,830,460 | 11/1931 | Berge | 411/455 |
| 3,252,677 | 5/1966 | Raymond . | |
| 3,758,060 | 9/1973 | Schuplin . | |
| 3,905,570 | 9/1975 | Nieuwveld | 24/339 |
| 4,427,328 | 1/1984 | Kojima | 411/508 |
| 4,454,699 | 6/1984 | Strobl | 411/510 |

FOREIGN PATENT DOCUMENTS

| 335549 | 3/1977 | Austria . | |
| 353875 | 12/1979 | Austria . | |
| 609662 | 11/1960 | Canada | 248/71 |
| 1012731 | 6/1977 | Canada . | |
| 1130147 | 5/1962 | Fed. Rep. of Germany . | |
| 1159702 | 12/1963 | Fed. Rep. of Germany | 248/71 |
| 2210443 | 5/1973 | Fed. Rep. of Germany . | |
| 2246833 | 3/1974 | Fed. Rep. of Germany . | |
| 2353055 | 5/1974 | Fed. Rep. of Germany | 248/74.1 |
| 1303079 | 7/1962 | France | 411/455 |
| 1324652 | 3/1963 | France | 174/164 |
| 21318 | 5/1961 | German Democratic Rep. . | |

OTHER PUBLICATIONS

Soviet Inventions Illustrated Week B22, Jul. 11, 1979, Section Q21.
Soviet Inventions Illustrated Week D11, Apr. 22, 1981.

Primary Examiner—J. Franklin Foss
Assistant Examiner—Robert A. Olson

[57] ABSTRACT

The invention relates to a fastening element, in particular one intended for the fastening of installation pipes or cables on a wall or ceiling, having an optionally longitudinally divided stem provided with spreaders on the stem surface for a positive connection with the wall of a bore hole; according to the invention, the spreaders are formed as eccentrics (2, 2', 2'', 2''') whose centers of rotation or axes of rotation (6) are positioned in the zone of the stem surface (1) and whose eccentric faces (3), whose distances from the centers of rotation or axes of rotation (6) increase in rotating direction on pulling the fastening element out of the bore hole, face away from the stem surface (1).

11 Claims, 18 Drawing Figures

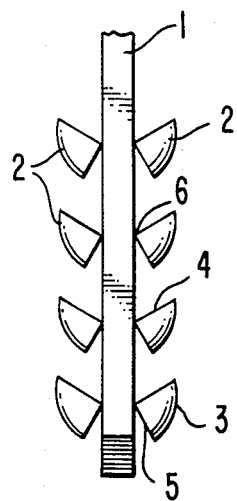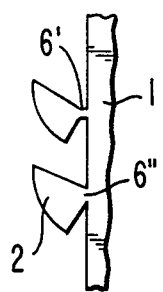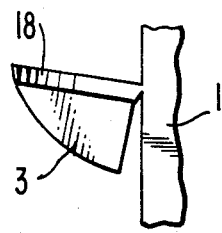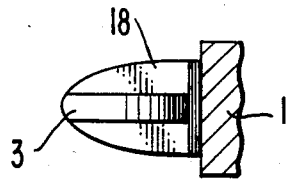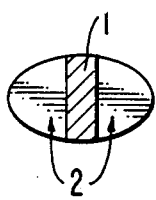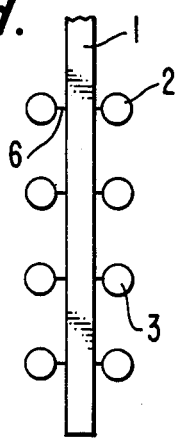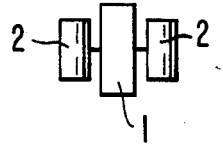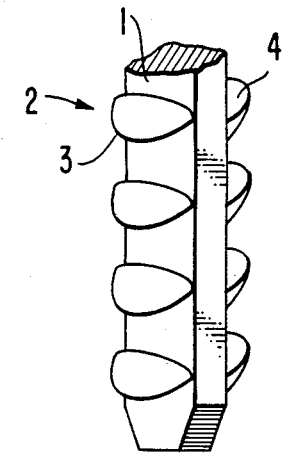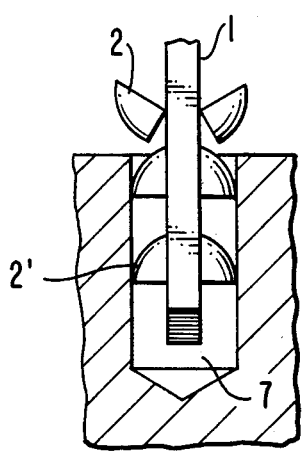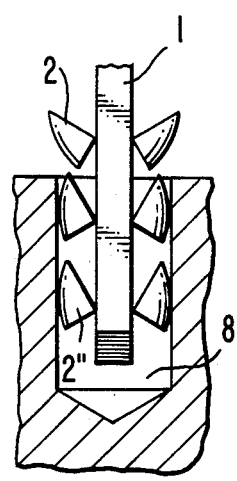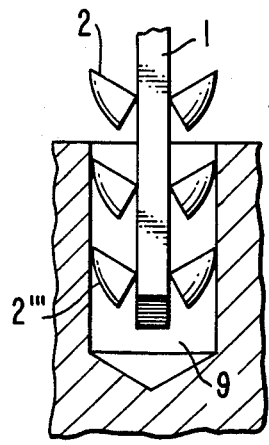

FIG. 7.  FIG. 8.  FIG. 9.
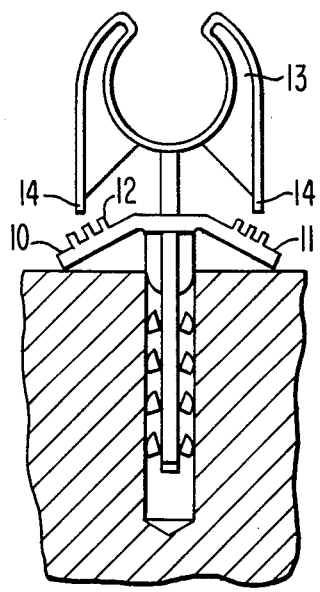
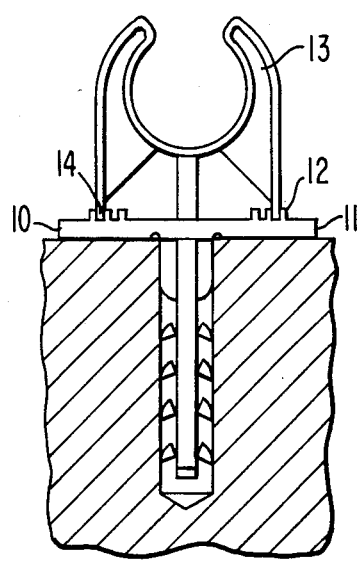
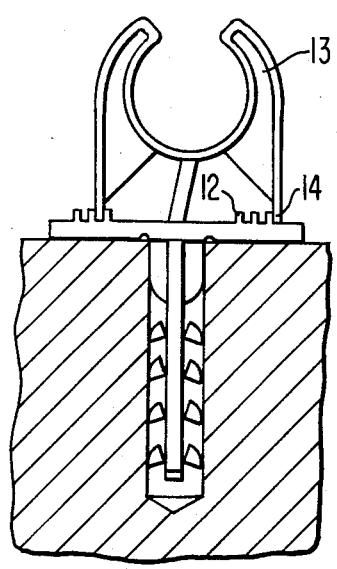
FIG. 10.  FIG. 11.
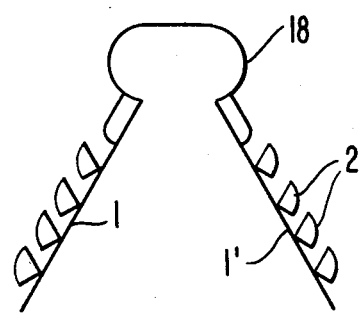
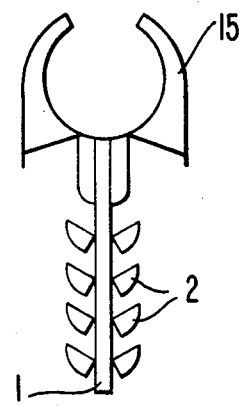
FIG. 12.  FIG. 13.
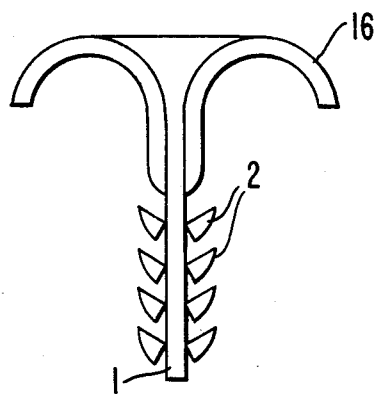
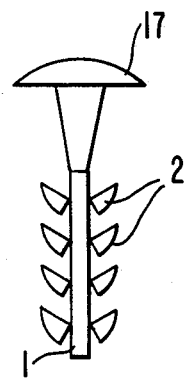

FASTENING ELEMENT

The invention relates to a fastening element, in particular one intended for installation of pipes or cables on a wall or ceiling, which is provided with an optionally longitudinally divided stem having spreaders on the stem surface for a positive connection with the wall of a bore.

In order to fasten electrical conduits, cables or the like on walls, the wall is provided with equally spaced bore holes in which dowels are then inserted and assembling clamps or supports for assembling clamps are screwed fast. A simpler variant of assembly provides for forcing spreader dowels formed in one piece with the assembling clamps into the bores.

Assembling by means of screws is hard work, expensive and very difficult in poorly accessible spots. The dowel clamps mentioned above as an alternative require more force on insertion into the bores, but can usually be pulled out by an equal application of force. As a result, these dowel clamps are not suitable for all types of loads.

It is the object of the invention to provide a fastening element which can be inserted into a bore without a tool and under applications of very little force, which fits to the wall of the bore hole without slipping when subjected to tension and resists any load occurring in practice. This is achieved in a fastening element of the type initially mentioned by forming the spreaders as eccentrics whose centers of rotation or axes of rotation are positioned in the zone of the stem surface and whose eccentric faces, whose distance from the centers of rotation or axes of rotation to a point of intersection of each eccentric face with a plane transverse to the stem and passing through the centers or axes of rotation increases as the eccentric rotates on pulling the fastening element out of the bore hole, face away from the stem surface. On insertion of the fastening element, the eccentrics yield to the side and roll along the wall of the bore hole. If the fastening element is subjected to traction, the loaded stem moves the eccentrics abutting the wall of the bore hole apart, thus in the direction of the maximum distance of each eccentric from its axis of rotation. The cohesion increases with the increase in traction. The embodiment is suitable for bore holes of different diameters. The boring does not have to be exact and it does not matter if the material of the wall is porous and the diameter of the bore hole thus varies. The eccentrics roll on the wall of the bore hole until the positive connection with the wall is equal to the force of traction. The biassing of the eccentrics in a radial direction outward causes even an unloaded fastening element to exert a certain radial force on the wall of the bore hole.

It is of advantage if the eccentric face is a spherical face whose center of curvature not coincident with the center of rotation or the axis of rotation. The spherical face rolls in axial direction of the stem on the wall of the bore hole and essentially abuts the entire circumference of the wall of the bore hole in radial direction, viewed in cross section, in each motion phase. The eccentric can have the shape of a body which is cut out of a sphere in two planes, with the two planes intersecting one another and the cutting trace being located outside of the center of the sphere. The axis of rotation of the eccentric is located within the zone of the cutting trace. The eccentric can also be trapeze-shaped, pear-shaped or oval (eccentric cam) and can be connected in one point—the center of rotation—or along a straight line—the axis of rotation—with the stem of the fastening element. To facilitate the rotation, a web can be provided between the eccentric and the stem. The fastening element as a mass product is made of plastic material, metal or other suitable materials. In order to prevent slipping when loading the fastening element, it is practical to provide the eccentric faces with a rough, in particular corrugated, surface. The choice of surface will depend on the building material of the wall (plaster, concrete). It was found that in the case of porous building materials, a smooth surface of the eccentric will bring about a better cohesion than a rough surface.

A particular embodiment provides for the stem to be of approximately rectangular cross section and for the eccentrics to complete the front face view of the fastening element into an oval, with the smallest diameter of the oval approximately corresponding to the nominal diameter of a corresponding bore hole. This oval is achieved when the plane face of the eccentric facing in the direction of fastening abuts the stem.

The special effect of the fastening element according to the invention resides in that fact that it automatically adjusts itself to various bore hole diameters and is retained for a given applied force with approximately equal cohesion regardless of the diameter of the bore hole. The eccentrics are so biassed that they abut the wall of the bore hole in any case.

Exemplary embodiments of the object of the invention are represented in the drawings.

FIG. 1 shows the stem of a fastening element in side view;

FIG. 1a shows a partial sectional view of the stem;

FIG. 1b shows an embodiment of an eccentric;

FIG. 1c is a bottom view of the embodiment of FIG. 1b;

FIG. 1d shows an embodiment of the invention with cylindrical eccentrics;

FIG. 1e shows a bottom view of FIG. 1d;

FIG. 2 shows a plan view of FIG. 1;

FIG. 3 shows a three-quarter view of FIG. 1;

FIGS. 4, 5 and 6 show a fastening element in bore holes of various diameters;

FIGS. 7, 8, 9 show a complete fastening element in various states of assembly and FIGS. 10, 11, 12 and 13 show various clamping and holding pieces connected to the stem of the fastening element.

FIG. 1 shows the stem 1 of a fastening element on which eccentrics 2 are pivotably arranged. The position of the eccentrics 2 shown in this figure is that after production and prior to use of the fastening element. This position of the eccentrics can be modified, however, and they can be more or less spread off from the stem. The stem 1 with the eccentrics 2 is preferably made of plastic material if the fastening element is intended for mounting installation components such as cables or pipes in walls. For heavier loads, the stem 1 and the eccentrics 2 can be made of metal or other materials.

Each one of the eccentrics 2 is defined by a spherical face 3 and two planes 4, 5, with the center of the sphere lying outside of the axis of rotation 6 of the eccentric 2. If two eccentrics 2 positioned in a cross sectional plane of the stem 1 are rotated in the same direction, the effective diameter of the fastening element is changed in the area of the stem. Instead of the axis of rotation 6 shown as a point of contact in FIG. 1, the eccentric can be fastened to the stem 1 by means of a web. FIG. 1a shows a possible attachment of eccentrics 2 to the stem 1 by means of a web 6' or a wider base face 6" which still permits a pivoting of the eccentric, as suitable forms of connection between stem and eccentric. The shape of the eccentric 2 according to FIG. 1 is shown in three-quarter view in FIG. 3. The eccentrics 2 are spherical segments whose centers of rotation do not coincide with the center of the sphere.

As shown in FIG. 1b, the eccentric 2 could for instance also be of flat shape. A flat element supporting the outwardly curving eccentric face 3 is carried by a plate 18 rotatably supported on the stem 1.

FIGS. 4, 5 and 6 show bore holes 7, 8, 9 of various diameters, with identical fastening elements inserted in them. The shaft 1 and the eccentrics 2', 2", 2''' in FIGS. 4, 5, 6 are of identical dimensions. The bore holes 7, 8, 9 were represented shorter than this would be the case in practice, so as to show one each pair of eccentrics 2 in their original base position to allow a comparison with their position in use. The stem 1 inserted in the bore 7 shows eccentrics 2' rotated to their smallest spread on insertion into the bore hole 7. As a result of the elasticity of the material they are made of, the eccentrics 2' are biassed to abut the wall of the bore hole. If the stem 1 is subjectd to traction, the eccentrics tend to increase the effective diameter of the stem 1 in the bore hole, which results in the exertion of a radial force of the eccentric 2' against the wall of the bore hole which brings about the fast seat of the fastening element.

FIG. 5 shows a large bore hole 8 into which the stem 1 is inserted, with the eccentrics 2" being rotated to a medium position on insertion. In FIG. 5 also, traction exerted on the stem causes an increase of the effective diameter by rolling the eccentric 2" along the wall of the bore hole, so that in this case, as well, an anchoring effect is achieved. The same applies to a bore hole 9 of even larger diameter whose wall is abutted by the eccentrics 2''' only slightly twisted in comparison to the base position of the eccentrics 2. (FIG. 6).

In order to subject an unloaded stem to a certain amount of traction, it is possible to provide inclined legs 10, 11 (FIG. 7) in the head zone of the stem which are rotatable with respect to the stem about an axis transverse to the major dimension of the stem. On full insertion, these legs are forced from the inclined position to the extended position against the elasticity of the material. The force of reaction acts in the direction of the traction exerted on the fastening element and thus biasses the element.

According to FIG. 7, 8, 9, the legs 10, 11 are further provided with a serration 12 and the clamping jaws 13 are provided with protrusions 14 for engagement with the serration. If the fastening element is forced into the bore hole axially up to the stop (FIG. 8), the protrusions 14 engage with the serration so that the central position of the clamping jaws 13 is assured. Since the stem 1 according to the embodiment shown in FIGS. 7, 8 and 9 allows bending in the upper zone (FIG. 9), the clamping jaws 13 can also be fixed off-center in the serration 12 on insertion of the stem. This possibility is important in the event that the bore holes are not bored exactly on a straight line for fastening a rectilinear conduit or pipe. Small upward or downward deviations can be corrected this way at final installation without having to bore a fresh hole. This means that a line can extend straight even if the bore holes are not properly placed.

FIGS. 10 to 13 show variants of embodiments of fasteners which can be provided on a stem 1. According to FIG. 10, the stem 1 is split in two halves, the halves 1', 1" are connected by means of a loop 18 made of plastic material or the like. A cable or pipe is placed into the loop 18, the two halves 1', 1" of the stem are then pressed together and inserted into a bore hole. This results in a dowel clamp which can be mounted (inserted) quickly and safely in any given position. FIG. 11 shows clamping jaws 15 for receiving an installation pipe. The fastening element according to FIG. 12 is intended for fastening two parallel lines. A double yoke 16 is formed onto the stem 1 and grips and holds the two lines. FIG. 13 shows a nail consisting of a stem 1 and a head 17 extending from it. A fastening element of this type serves for fastening objects provided with holes, such as directional sign plates or the like. There are many possibilities of application, as the type of fasteners provided on the stem 1 can have any given form. For instance, the stem could be provided with a hook or lenghtened into a screw bolt for screwing an object into a wall (floor, ceiling). If a plate with a hole in it (washer) is placed on the screw bolt prior to screwing on the nut, this results in an anchor bolt whose projecting screw bolt can be used for fastening purposes.

In an embodiment with a divided stem (such as FIG. 10), the biassing of the eccentric can be achieved by the spreading effect of the loop 18. The eccentrics can then be arranged in any given position on the stem without biassing them in relation to the stem. An example for a preferred position is that of 90 degrees in which the total cross section of the fastening element is greatest and thus the range of bore holes for which a concrete embodiment of a fastening element is suitable is largest.

In order to increase the range of application, it is possible to insert cores between the legs so that the legs are spaced apart and the eccentrics will hold fast in a hole of which they would drop out without the cores. These cores can hang on the fastening elements in the form of tongue-like platelets and then either be torn off or inserted between the legs in order to increase the diameter.

It is also possible to provide a fastening element with more than two legs connected to one another (optionally elastically and radially biassed).

If the legs in an embodiment according to FIG. 10 have flanks which are inclined in cross section (cross sections in trapeze or triangle form), it is possible to insert a second fastening element, rotated by 90 degrees, into a bore hole together with the first-mentioned fastening element according to FIG. 10. This means that there are four legs in the bore hole in this case. A combined embodiment can be used for even larger bore holes. The loop 18 then surrounds a pipe to be installed, while the loop of the fastening element axially rotated by 90 degrees serves as a support for the pipe and forces this outward. The two legs of the one fastening elements are thus subjected to traction and their eccentrics effect a particularly fast force connection with the wall of the bore hole.

I claim:

1. A fastening element, in particular intended for the fastening or installation of pipes or cables on a wall or ceiling, having a stem provided with spreaders on an outer surface of the stem for providing a positive connection with the wall of a bore hole, characterized in that each spreader comprises an eccentric (2, 2', 2", 2''') formed integrally with the stem and connected to the stem by a thin flexible connection with a center of rotation positioned near the stem surface (1) and having an eccentric face (3) so that a distance from the center of rotation to a point on the eccentric face in a plane transverse to the stem and passing through the center of rotation increases on pulling the fastening element with respect to the bore hole, and wheein said eccentric surface is convex.

2. A fastening element according to claim 1, wherein the eccentric face (3) in a longitudinal cross-section forms a line curved outward from the stem.

3. A fastening element according to claim 2, wherein the eccentric face (3) has the shape of a sphere whose center of curvature is displaced from said center of rotation.

4. A fastening element according to claim 2 wherein the eccentric face (3) is cylindrical and has a cylindrical axis displaced from said axis of rotation of the eccentric (2).

5. A fastening element according to claim 4, wherein the eccentric (2) is connected to the stem (1) by means of a web (FIG. 1a).

6. A fastening element according to claim 5, wherein each eccentric face (3) is provided with a rough surface.

7. A fastening element according to claim 6, wherein the stem (1) has an approximately rectangular transverse cross-section, and wherein there are at least two adjacent eccentrics (2) each having a first plane surface (4) and a second plane surface (5), said eccentrics when positioned in said bore hole so that said first plane surface (4) rests against said stem, and said second plane surface (5) of said eccentrics produce a transverse profile which is oval.

8. A fastening element according to claim 7, wherein the eccentrics (2) are biased to rotate about said center of rotation or said axis of rotation away from said stem.

9. A fastening element according to claim 8, wherein a portion of the eccentric face (2) is adapted to abut the stem (1) when said eccentrics are in a position such that said distance from said center of rotation to said point on said eccentric face is a maximum.

10. A fastening element according to claim 9, wherein the stem (1) is provided on an upper end with at least one leg (10, 11) which extends outwardly from the stem and is rotatable with respect to said stem about an axis transverse to said stem.

11. A fastening element according to claim 10, wherein two diametrically opposed legs (10, 11) are provided with a serration (12), and a fastening means (13) is provided on the stem with protrusions (14) which engage the serration at predetermined positions of the legs (10, 11).

* * * * *